Patented Feb. 6, 1934

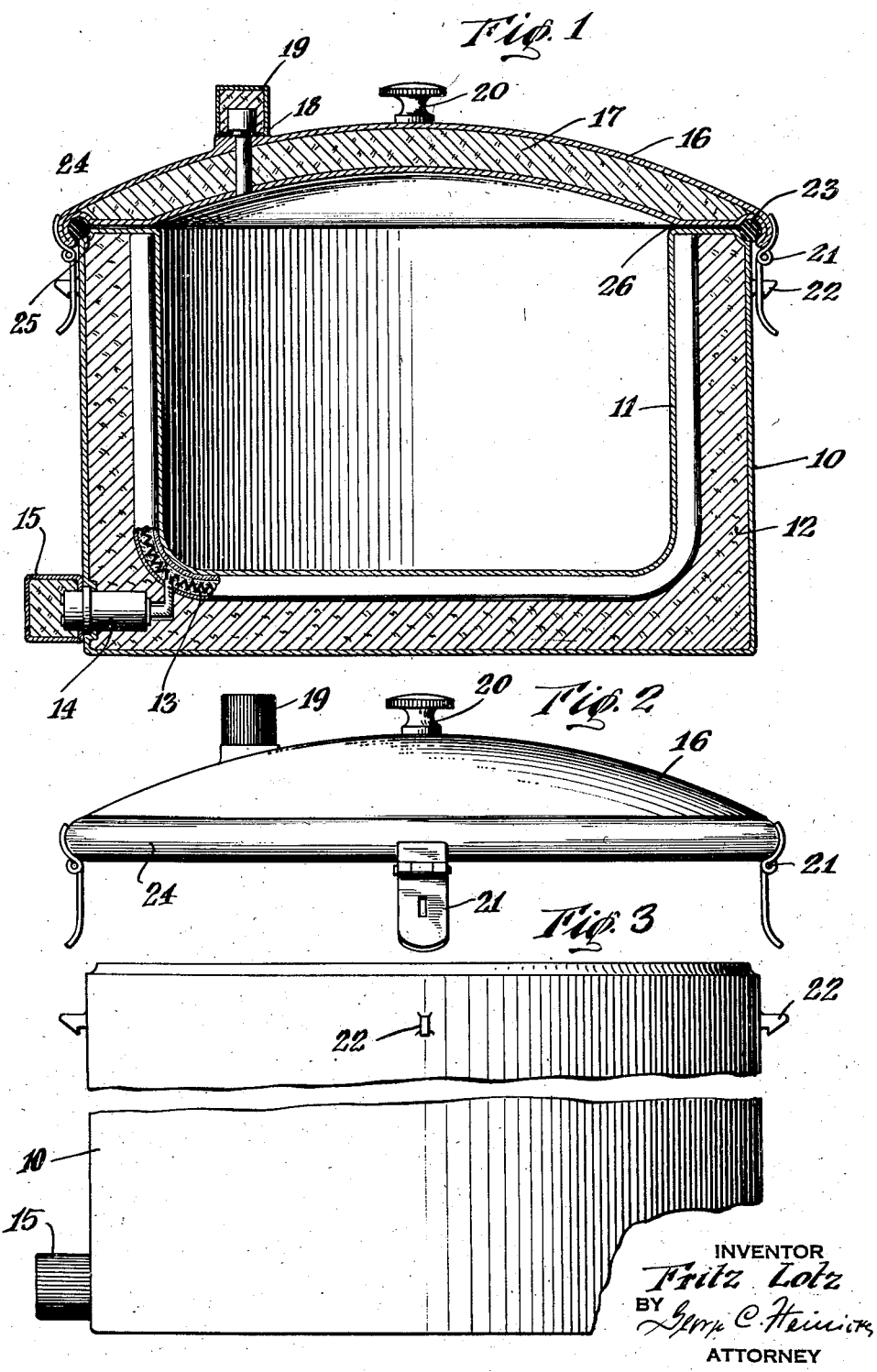

1,946,220

UNITED STATES PATENT OFFICE 1,946,220

COOKER

Fritz Lotz, New York, N. Y.

Application January 23, 1933. Serial No. 653,125

2 Claims. (Cl. 219—44)

This invention relates to improvements in cookers for heating food by electricity and keep the same simmering within the cooker when the electric current is interrupted, and it is the principal object of my invention to provide a cooker of comparatively simple and inexpensive construction, yet durable and highly efficient in use.

Another object of my invention is the provision of a cooker in which the food, such as for instance potatoes, vegetables etc. are kept simmering in a hermetically sealed vessel either with or without the use of water and which thus may just as well be used for frying meat etc.

Still another object of my invention is the provision of a cooker, the walls and cover of which are insulated by a material impervious to heat, the cover being equipped with a safety valve adapted to be covered by a removable cap filled with a material impervious to heat as soon as the steam development in the vessel has ceased after the removal of the plug connecting the heating element of the cooker with a source of electricity from its socket which is then also covered by a cap filled with a material impervious to heat.

A further object of my invention is the provision of a cooker the cover of which is provided with a handle and a plurality of hasp fastenings engaging suitable staples on the vessel, while a flanged rubber gasket located in a hollow flange of the cover with two thirds of its thickness engages a groove in the vessel with the remaining one third of its thickness, while its flange hermetically seals the point of engagement between cover and vessel as soon as the hasps are swung into their locking positions.

A still further object of my invention is the provision of a cooker of the above type which may be made of any suitable material and shape and used with like good results in households, restaurants, hospitals etc. and in sizes suitable for the various purposes in view.

These and other objects of my invention will become more fully known as the description thereof proceeds and will then be specifically defined in the appended claims.

In the accompanying drawing forming a material part of this disclosure:

Fig. 1 is a sectional elevation of a cooker constructed according to my invention.

Fig. 2 shows the cover detached from the vessel.

Fig. 3 is a fragmentary front elevation of the cooker with the cover separated therefrom.

As illustrated, a vessel 10 has its outer wall spaced from its inner porcelain enameled wall 11 and insulated therefrom by packing the space between the outer and inner wall with a material 12 impervious to heat.

An electric heating element 13 is arranged in the space between the outer and inner wall and closely engages with the inner wall or opens towards the same. The heating element is supplied with current from a suitable source of electricity by means of the plug socket 14, which is covered by a removable cap 15 filled with heat insulating material upon the removal of the plug.

A double walled cover 16 has the space between its walls filled with a material 17 impervious to heat and is equipped with a safety valve 18 which can be covered by a cap 19 filled with heat insulating material and placed upon the valve as soon as the current is interrupted, and the steam development within the cooker stops.

A knob or handle 20 facilitates the handling of the cover, and a plurality of hasp fastenings 21 on the cover passing over staples 22 on the vessel 10 clamps the cover to the vessel.

In order to produce a tight closure between cover and vessel a rubber gasket 23 is for two-thirds of its thickness embedded in a hollow marginal flange 24 of the cover and engages with the remaining one-third of its thickness a groove 25 in the upper edge of the vessel. The gasket has an inner flange 26 for tightening the joint between cover and vessel.

In use the food to be cooked is placed into the cooker with the addition of water to about one half of the capacity of the cooker or with food to be fried, and the cover is closed by means of the hasps whereupon the current is turned on.

As soon as the steam developed escapes through the safety valve in the cover to indicate the fact that the water is boiling, the current is turned off and the caps are placed over the safety valve and the plug socket after removal of the plug, and the food will then be kept simmering as in a fireless cooker. Inspection may be made at certain intervals by lifting the cover in order to ascertain the progress of the cooking, care should be taken to separate the cover not too long from the vessel in order to prevent the escape of too much heat.

It will be understood that I have described and shown the preferred form of my cooker only as one example of the many possible ways to practically construct my cooker, and that I may make such changes in the general arrangement and in the construction of the minor details of the cooker which come within the scope of the appended claims without departure from the spirit of my invention and the principle involved.

Thus for instance, I may use in place of the heat insulating material a vacuum in which case I may preferably use as material for the vacuum chamber glass suitably coated and provided with glass tubes for the safety valve and the current connection, suitably connected with the glass vessel by melting. An asbestos coating is then used to protect the inner face of the glass of the vacuum chamber against the heat.

I may also conveniently unite any number of cookers to a battery of interconnected vessels which may be simultaneously connected with a source of electricity or disconnected therefrom.

Having thus described my invention what I claim as new and desire to secure by Letters Patent is:

1. The combination of a vessel having walls containing a heat insulating material with a cover also having walls containing a heat insulating material, said cover having a hollowed lower flange and said vessel having a groove in its upper rim, a flanged rubber gasket in the flange of said cover engaging in the groove of said vessel's rim, means to clamp said cover to said vessel to press said gasket into intimate engagement of cover and vessel to produce an hermetically tight closure between cover and vessel, a detachable electric heating means for said vessel, said closure keeping the material in said cooker simmering after disconnection of said heating means, a safety valve in said cover, and an electric socket for said vessel in connection with said heating means, and removable caps containing a material impervious to heat for covering said safety valve and socket upon the disconnection of said heating means.

2. In an electric cooking vessel of the class described an inner porcelain vessel spaced from the walls of the cooking vessel, a heating element arranged in the space between the inner and outer vessel and heat insulating material between the walls of said outer and inner vessel, a double-walled cover having the space between its walls filled with a material impervious to heat, a hollow marginal flange formed with said cover, the upper edge of the outer vessel grooved, and a rubber gasket embedded for two-thirds of its thickness in the hollow space of said flange and engaging with the remaining one-third of its thickness in the groove in the upper vessel edge, an inner flange formed with said gasket for tightening the joint between cover and vessel, means to securely and tightly clamp the cover to the vessel, a plug socket forming a means for connecting said heating element with a source of electricity, and a removable cap filled with heat insulating material covering said plug socket upon the removal of said plug, a safety valve on said cover, and a cap filled with heat insulating material to cover said valve as soon as the current is interrupted and the steam development in the cooker stops, said caps preventing loss of heat to keep the food within the cooker simmering for a considerable time.

FRITZ LOTZ.